United States Patent
Hollmann et al.

(10) Patent No.: US 7,704,021 B2
(45) Date of Patent: Apr. 27, 2010

(54) METHOD AND TOOLING FOR MACHINING THE ANNULUS OF GAS-TURBINE ROTOR PROVIDED WITH INTEGRALLY FORMED-ON BLADES

(75) Inventors: Jan Hollmann, Cologne (DE); Gregor Kappmeyer, Bad Homburg (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 12/379,377

(22) Filed: Feb. 19, 2009

(65) Prior Publication Data

US 2009/0245959 A1 Oct. 1, 2009

(30) Foreign Application Priority Data

Feb. 20, 2008 (DE) .................. 10 2008 010 252

(51) Int. Cl.
*B23C 3/18* (2006.01)
(52) U.S. Cl. .................. 409/132; 29/889.23; 407/54
(58) Field of Classification Search ............ 409/131, 409/132; 29/889, 889.2, 889.23, 889.6; 407/54, 407/53; *B23C 3/18*
See application file for complete search history.

(56) References Cited

U.S. PATENT DOCUMENTS

| 2,585,973 | A | * | 2/1952 | Stieglitz | 29/889 |
| 2,662,450 | A | * | 12/1953 | Angell et al. | 409/198 |
| 4,536,932 | A | * | 8/1985 | Athey | 29/889.23 |
| 5,122,966 | A | * | 6/1992 | Jansen et al. | 700/178 |
| 6,684,742 | B1 |  | 2/2004 | White |  |
| 6,991,434 | B2 | * | 1/2006 | Heinrich et al. | 416/241 R |
| 7,305,762 | B2 | * | 12/2007 | Mola | 29/888.024 |
| 2009/0304473 | A1 | * | 12/2009 | Holze et al. | 409/131 |

FOREIGN PATENT DOCUMENTS

| DE | 317586 | 3/1918 |
| DE | 10312224 | 10/2004 |

(Continued)

OTHER PUBLICATIONS

Machine Translation of Description and Claims of JP-2001-328019-A, which Japanese patent document was published in Nov. 2001.*

(Continued)

*Primary Examiner*—Erica E Cadugan
(74) *Attorney, Agent, or Firm*—Timothy J. Klima; Shuttleworth & Ingersoll, PLC

(57) ABSTRACT

With an integrally bladed rotor, material removal is performed from the annulus (5) on a wide, even machining path (8) using the front-side cutting area of an essentially cylindrical cutter head (7). The tool shank (9) is shaped and dimensioned such that it does not collide with the opposite lateral surfaces of the differently curved and twisted blades (4). This type of machining enables an essentially even, smooth annulus surface to be obtained with a reduced number of overlapping machining paths (8). The time required for machining the annulus and the tool wear are reduced. With an annulus machined in accordance with the present invention, the rotor will satisfy high requirements on aerodynamics.

6 Claims, 1 Drawing Sheet

FOREIGN PATENT DOCUMENTS

| | | | |
|---|---|---|---|
| EP | 0992310 | | 4/2000 |
| EP | 1627706 | | 2/2006 |
| FR | 2635478 | | 2/1990 |
| JP | 61-044521 A | * | 3/1986 |
| JP | 2001328019 | | 11/2001 |
| KR | 20040091818 | | 11/2004 |
| SU | 1502230 A | * | 8/1986 |

OTHER PUBLICATIONS

Machine Translation of Description of Drawings of JP-2001-328019-A, which Japanese patent document was published in Nov. 2001.*

German Search Report dated Jul. 14, 2009 from counterpart German patent application.

European Search Report dated Aug. 25, 2009 from counterpart European patent application.

* cited by examiner

U.S. Patent Apr. 27, 2010 US 7,704,021 B2
Fig. 1
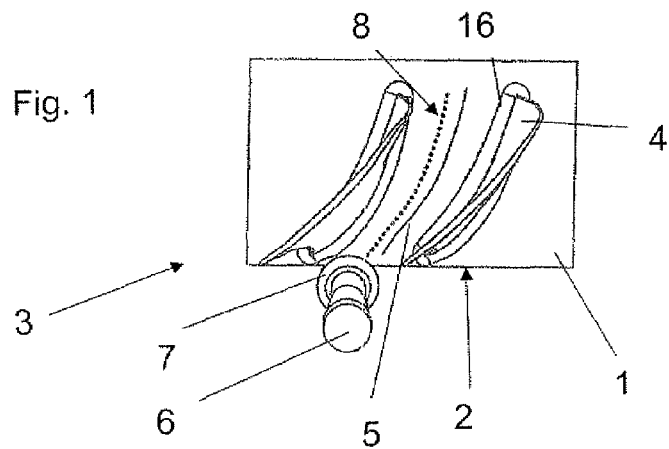
Fig. 2
Fig. 3
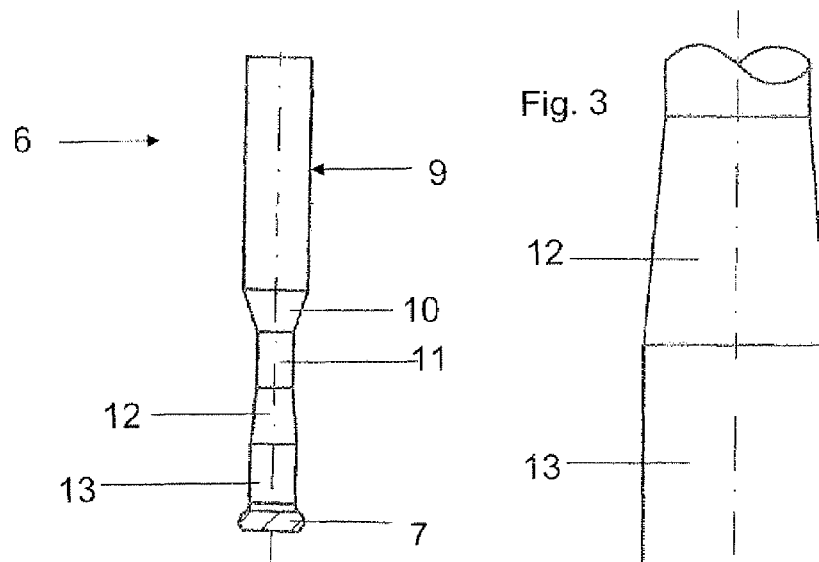
Fig. 4
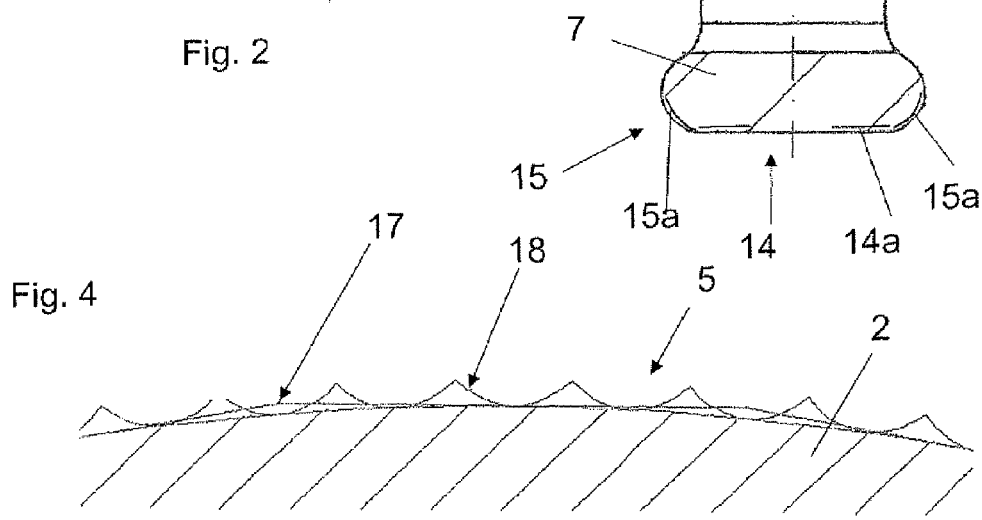

METHOD AND TOOLING FOR MACHINING THE ANNULUS OF GAS-TURBINE ROTOR PROVIDED WITH INTEGRALLY FORMED-ON BLADES

This application claims priority to German Patent Application DE 102008010252.0 filed Feb. 20, 2008, the entirety of which is incorporated by reference herein.

This invention relates to a method for machining the annulus of a gas-turbine rotor provided with integrally formed-on blades and a tooling for the performance of the method.

Under the aspects of reliability, weight reduction, performance increase and service life, gas-turbine rotors, and in particular the rotors of the compressors of gas turbine engines, are provided with a blading which is integrally formed on the annular periphery of a disk. Such components are termed "blisks", with the term "blisk" being a shortened form of "blade integrated disk". As is generally known, blisks are manufactured by welding, in particular friction welding, separately manufactured blades to the peripheral annular surface of the preferably forged disk or by a cutting or chemical stock removal process starting at the outer annular surface of the disk. Upon shaping the blades by the known material removal processes, the blade surfaces and edges and the bottom thereby produced between the blades, which is termed annulus, are finish-machined. Because of the small distance between adjacent blades and the complexly and even differently curved and twisted pressure and suction sides of the blades, the annulus, which is remote from the blade tips, and the transition area (fillet) between annulus and the lateral blade surfaces are machined by a copy-milling cutter having a crowned tip. The copy-milling or die-sinking cutter, which is also referred to as ball nose cutter, is provided with a conical cutting portion behind the ball tip and can be positioned such in the gap between two adjacent blades that the lateral surface of the copy-milling cutter will not collide with the sides of the blade airfoils. Machining of the annulus and fillet areas by use of the copy-milling cutter, whose crowned tip must be routed over the annulus in a multitude of adjacent paths, is very time-consuming and produces adjoining, crescent-shaped machining paths with high roughness or profile deviation on the annulus surface due to which the blisks will not satisfy high aerodynamic requirements.

In a broad aspect the present invention provides a method for finish-machining the annulus between opposite blades of a blisk and a corresponding tool for the performance of the method to reduce machining time and tool wear and obtain an even annulus surface with minimum shape or profile deviation which satisfies high aerodynamic requirements.

With a method for machining the annulus of an integrally bladed rotor, the present invention essentially provides for material removal from the annulus on a wide, even machining path using the front-side cutting surface of an essentially cylindrical cutter head. This type of machining enables an essentially even, smooth annulus surface to be obtained with a reduced number of overlapping machining paths. The time required for machining the annulus and the tool wear are reduced. The improved conditions for chip removal also enable the surface quality of the annulus to be improved, thereby providing for the integrally bladed rotor to satisfy high requirements on aerodynamics.

Since the maximum machining width is less than the minimum distance between opposite fillets of the blades and can be more than half the minimum fillet distance, the annulus and the respective transition area (fillet) to the lateral blade surface can be completely machined by only two overlapping machining paths.

According to the present invention, the cutting tool for the performance of the method has an essentially cylindrical cutter head with a plane front-side cutting area and correspondingly straight cutting edges arranged on a tool shank. The diameter of the tool shank is constricted such in the portion situated between the blades during machining that, as machining in a constant position is performed, it is prevented from colliding with the blade surfaces.

In accordance with a further feature of the present invention, the peripheral lateral surface of the cutter head is concave and has correspondingly curved cutting edges. The curvature of the lateral surface is intended to avoid sharp edges.

The diameter of the cutter head is less than the minimum distance between the opposite fillets and preferably larger than half the minimum distance between the two fillets.

The present invention is more fully described in light of the accompanying drawing showing a preferred embodiment. In the drawings, FIG. 1 is a partial view of a blisk with a cutting tool arranged between two blades which are integrally connected to the disk, FIG. 2 is a side view of the cutting tool, FIG. 3 is an enlarged representation of the cutter head area as per FIG. 2, and FIG. 4 is a highly enlarged representation of the surface profile of the annulus obtained with the inventive and with conventional machining methods.

As shown in FIG. 1, blades 4, which are twisted and have different curvature, are integrally formed on the circular periphery 1 of the disk 2 of a blisk 3. For simplicity, only a partial view with two blades 4 is here shown. The portion of the periphery of the disk 2 remaining between the blades 4 is the annulus 5 which is machined with a cutting tool 6 with cutting edges which are plane (straight) on the front face and outwardly rounded on the curved lateral surface of the cutter head 7 to produce its final contour in the even area and in the transition area 16 (fillet) to the blade surfaces on two machining paths 8 (in the present embodiment). The cutter head 7, which rotates and is movable along the machining paths 8 during machining, is connected to a tool shank 9 which, in turn, is connected to a driving mechanism. The diameter of the tool shank 9 is constricted such in an area between the two opposite, curved and twisted blades 4 that, in a position vertical to the annulus 5 on the respective machining path 8, it will not collide with the opposite sides of the blades 4. In the present embodiment, the diametrically reduced portion of the tool shank 9 begins with a conically constricted portion 10 which, in this sequence, is followed by a straight portion 11, a conically flaring portion 12 and again a straight portion 13 extending towards the cutter head 7. The cutter head 7 has straight cutting edges 14a on the plane cutting area 14 (front face) and correspondingly curved cutting edges 15a on the toroidal lateral cutting area 15 whose curvature can correspond to the rounding of the fillet 16. The maximum diameter of the cutter head 7 is slightly less than the minimum distance between the blades 4 in the area of the fillet 16, but more than half the maximum distance between the blades 4 in the area of the fillet 16. Thus, the annulus 5 and the fillet 16 can be finish-machined on only two—centrally overlapping—machining paths 8 with little time requirement. Compared with a surface structure 18 obtained with conventional methods and tooling, the surface profile 17 so obtained is essentially even and smooth, see FIG. 4. The improved conditions for chip removal can also provide for an increase in surface quality. The significantly lower number of machining paths considerably reduces tool wear.

LIST OF REFERENCE NUMERALS

1 Periphery
2 Disk
3 Blisk
4 Blade
5 Annulus
6 Cutting tool
7 Cutter head
8 Machining path
9 Tool shank
10 Conically constricted portion
11 Straight portion
12 Conically flaring portion
13 Straight portion
14 Plane front-side cutting area
14a Straight cutting edges
15 Peripheral lateral cutting area (curved)
15a Curved cutting edges
16 Fillet (transition area)
17 Even surface profile
18 Conventional surface structure

What is claimed is:

1. A method for machining an annulus of a gas turbine rotor having integrally formed-on blades extending from a circular periphery of the annulus, comprising:
performing wide, even material removal on a respective machining path between a pair of adjacent ones of the blades using a planar front-side end cutting-edge area of a cutter head by moving the cutter head along a path that is parallel to the circular periphery surface of the annulus, the cutter head also including curved cutting edges on a toroidal lateral cutting area for machining a transition area between the blades and the annulus; and
avoiding contacting opposite inner surfaces of the adjacent blades with a cutting tool supporting the cutter head.

2. The method of claim 1, and further comprising machining the annulus with at least two overlapping ones of the machining paths.

3. The method of claim 2, wherein a width of a respective one of the machining paths is less than a minimum distance between the adjacent blades at an annulus level and more than half the minimum distance.

4. The method of claim 3, wherein the step of avoiding contact includes providing a tool shank supporting the cutting head with a diametrically reduced portion, as compared to a diameter of the cutter head.

5. The method of claim 2, wherein the step of avoiding contact includes providing a tool shank supporting the cutting head with a diametrically reduced portion, as compared to a diameter of the cutter head.

6. The method of claim 1, wherein the step of avoiding contact includes providing a tool shank supporting the cutting head with a diametrically reduced portion, as compared to a diameter of the cutter head.

* * * * *